United States Patent [19]

Aihara

[11] Patent Number: 6,092,019
[45] Date of Patent: Jul. 18, 2000

[54] METHOD OF JUDGING MONITORING CONDITION FOR DIAGNOSIS OF ENGINE

[75] Inventor: Masaaki Aihara, Tokyo, Japan

[73] Assignee: Fuji Jukogyo Kabushiki Kaisha, Tokyo, Japan

[21] Appl. No.: 08/300,855

[22] Filed: Sep. 6, 1994

[30] Foreign Application Priority Data

Sep. 30, 1993 [JP] Japan .................................. 5-244724

[51] Int. Cl.[7] .................................................. F02D 45/00
[52] U.S. Cl. ...................... 701/113; 701/107; 123/339.1
[58] Field of Search ..................... 364/431.04, 431.06, 364/431.08, 511, 442; 123/339, 568; 73/116; 235/375; 324/379; 701/113, 107

[56] References Cited

U.S. PATENT DOCUMENTS

| | | | |
|---|---|---|---|
| 3,872,846 | 3/1975 | Taplin et al. ............................. | 123/568 |
| 4,301,678 | 11/1981 | Full et al. ................................. | 73/116 |
| 4,691,288 | 9/1987 | Kay et al. ................................ | 364/511 |
| 5,083,541 | 1/1992 | Chen ........................................ | 123/339 |
| 5,237,504 | 8/1993 | Holmes et al. ..................... | 364/431.08 |
| 5,297,047 | 3/1994 | Matsuno ............................. | 364/431.06 |
| 5,305,635 | 4/1994 | James et al. .............................. | 73/116 |
| 5,387,870 | 2/1995 | Knapp et al. ............................ | 324/379 |

*Primary Examiner*—William A. Cuchlinski, Jr.
*Attorney, Agent, or Firm*—Smith, Gambrell & Russell, LLP

[57] ABSTRACT

In order to achieve a correct and efficient diagnosis on an engine, it is important to search a steady state of engine operation correctly and frequently as far as possible. In this invention the steady state operation is judged by checking whether or not the average value of an engine parameter for a predetermined monitoring period is within a predetermined restriction width, whereby so many chances of monitoring for diagnosis can be provided.

8 Claims, 8 Drawing Sheets

METHOD OF JUDGING MONITORING CONDITION FOR DIAGNOSIS OF ENGINE

BACKGROUND OF THE INVENTION

The present invention relates to a method for judging a monitoring condition for diagnosis of an engine and more specifically relates to a method for judging whether or not an engine is in a steady state operation during which the monitoring for diagnosis is performed.

Recently, with an increase of vehicles utilizing computer-based powertrain control systems, more and more vehicles are equipped with a self-diagnostic or an on-board type diagnostic system capable of monitoring malfunctions of devices or systems, such as a catalytic converter, oxygen sensors, an ignition system, miscellaneous actuators and other sensing equipments installed on vehicles.

In monitoring those devices or systems, the most important thing is to determine the engine operating condition in which the monitoring is properly performed and the period during which the data are collected into the diagnostic system.

For example, Japanese Patent Application Laid-Open No. 1987-172221 discloses a diagnostic technology in which the diagnosis is executed by simply comparing the output level with the threshold level. However, this diagnostic technology often tends to provide erroneous judgements when the engine is in a transient condition in which the engine operational condition changes momentarily. That is to say, in order to obtain reliable results constantly, it is necessary to monitor the object device under a stable condition as far as possible excepting in some peculiar cases.

The stable condition described here is defined as a steady state operation of an engine in which an engine rotational speed is constant and at the same time among the engine parameters of an intake air amount, an intake manifold pressure, a fuel injection amount, and a throttle opening angle, at least one engine parameter is also constant.

Further, especially when it is needed to detect a malfunction derived from the deterioration of the device itself, a certain period of monitoring is absolutely necessary.

The prior method of judging whether an engine parameter like an engine speed is constant or not when judging a steady state operation has to check whether or not the engine parameter exists between an upper limit and a lower limit, and at the same time whether the variation of the engine parameter is within a predetermined band width.

In general, the range of the steady state operation becomes more accurate and therefore the result of diagnosis becomes more reliable, if the above upper and lower limits and the predetermined band width are established in a smaller size.

However, if the above limits or the band width are too small, it happens that the diagnosis would not start due to no chance of the steady state judgement, or the diagnosis would discontinue halfway due to a very short monitoring period.

Further, there is limitation in the accuracy of a sensor or the processing capability of the CPU when those limits or the band width are attempted to be made small.

SUMMARY OF THE INVENTION

An object of the present invention is to provide a method of correctly judging a steady state operation of engine for diagnosis.

Another object of the present invention is to provide a method capable of increasing a chance of diagnosis without losing reliability.

To achieve the above objects, the method according to the present invention is provided with the following steps of:

detecting a first engine parameter; detecting a second engine parameter; memorizing an initial value of the first engine parameter at the start of monitoring; accumulating the detected second engine parameter; calculating a difference between the initial value of the first engine parameter and the detected first engine parameter; discontinuing monitoring if the difference is outside of the first predetermined restriction width before the end of said monitoring period; averaging the second engine parameter over the monitoring period based on the accumulated second engine parameter at the end of the monitoring period; discontinuing monitoring if the averaged second engine parameter is outside of a second predetermined restriction width at the end of the monitoring period; and judging that the engine is in a steady state operation if the averaged second engine parameter is within the second predetermined restriction width at the end of the monitoring period.

DETAILED DESCRIPTION OF THE PREFERRED EMBODIMENT

Figure 5:
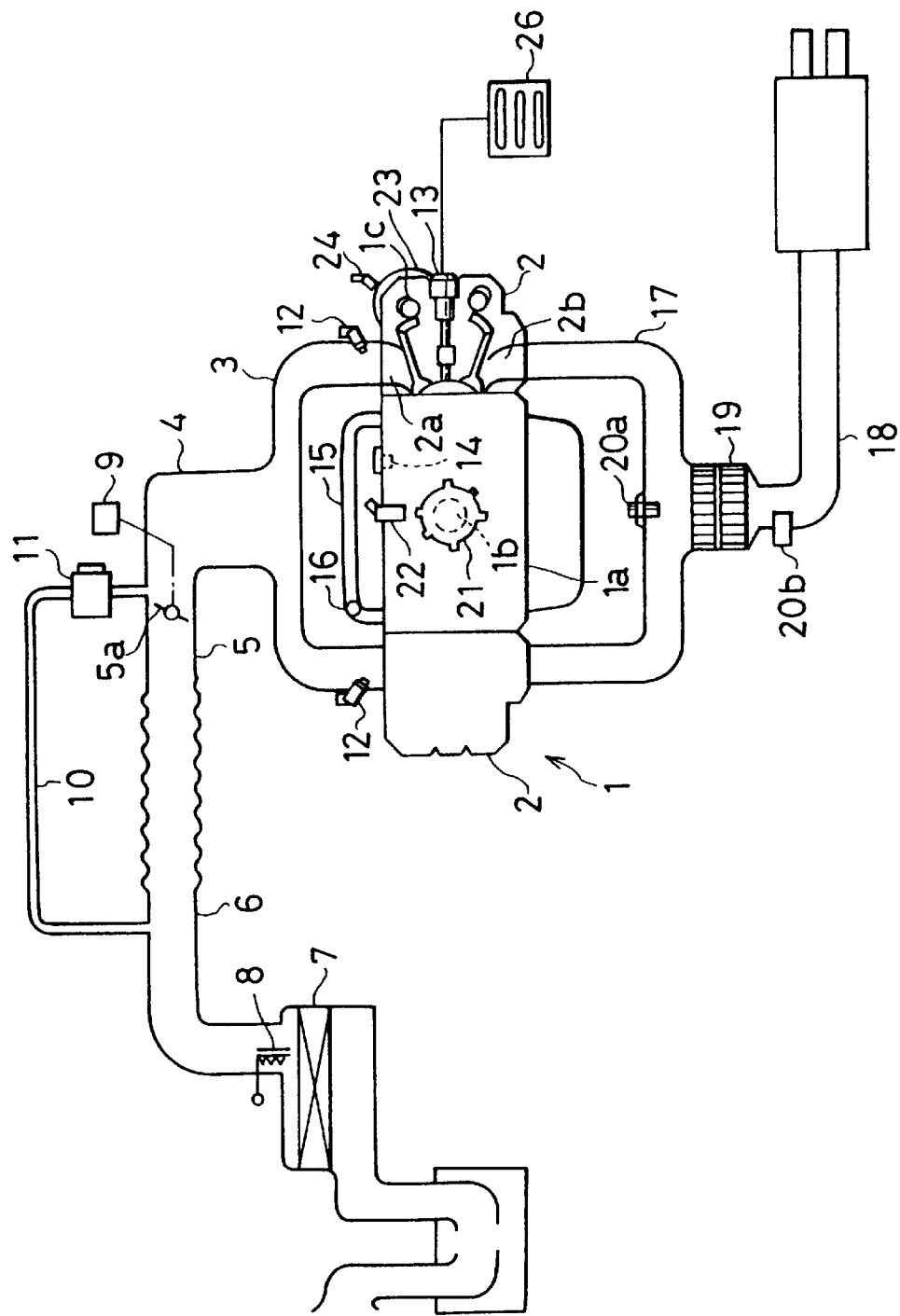
FIG. 5 is a schematic diagram of the engine and the engine control system according to the present invention.

FIG. 5 is a schematic diagram showing an engine (a horizontally opposed four cylinder engine is illustrated herein) and an engine control system in which a numeral 1 denotes an engine and a numeral 2 shows a cylinder head mounted on a right and left bank of the engine 1. An intake port 2a and an exhaust port 2b are formed in the cylinder head 2. A throttle chamber 5 is connected to an intake manifold 3 communicated with an intake port 2a via an air chamber 4. An air cleaner 7 is disposed upstream of the throttle chamber 5 via an intake air duct 6. Further, an air flow sensor 8 is disposed upstream the intake air duct 6 and downstream the air cleaner 7. Further, a throttle opening angle sensor 9 for detecting a throttle opening angle ALP is coupled with a throttle valve 5a and in a by-pass passage 10 connecting the upstream portion of the throttle valve 5a and the downstream portion thereof, an idle speed control valve (ISCV) 11 is mounted. Further, a fuel injector 12 is disposed at the intake port 2a of the intake manifold 3 and a spark plug 13 is diposed in the cylinder head 2. Also an igniter 26 is connected to the spark plug 13.

Further, a knock sensor 14 is mounted on a cylinder block 1a of the engine 1 and a coolant temperature sensor 16 is disposed in a coolant passage 15 formed in the cylinder block 1a in order to detect a coolant temperature TW. Further, an exhaust pipe 18 is connected to the junction of an exhaust manifold 17 connected to each of the exhaust port 2b and at the above junction there is provided a catalytic converter 19. Furthermore, a front (F) $O_2$ sensor 20a is disposed at the upstream portion of the catalytic converter 19 and a rear (R) $O_2$ sensor at the downstream portion thereof.

Furthermore, a crank rotor 21 is coaxially coupled with a crank shaft 1b with is rotationally mounted on the cylinder block 1a and a crank angle sensor 22 is mounted on the periphery of the crank rotor 21. Further, a cam angle sensor 24 is mounted on a cam rotor 23 which is coaxially coupled with a cam shaft 1c in the cylinder head 2.

In an ECU 31 which will be described hereinafter, an engine speed NE and an ignition timing are determined based on signals detected by the crank angle sensor 22. Further, the cam angle sensor 24 identifies the cylinder in the combustion stroke.

Figure 6:
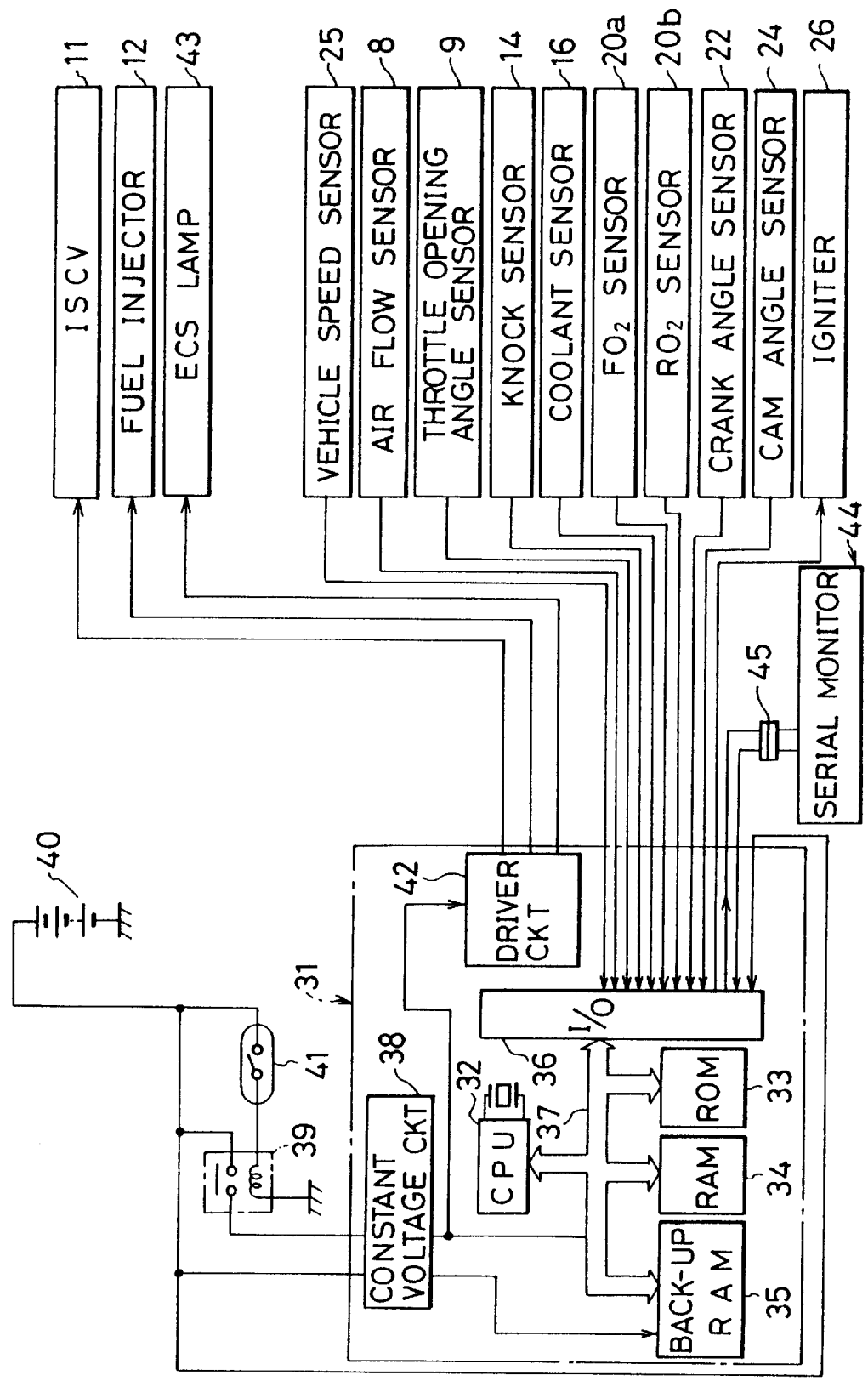
FIG. 6 is a schematic diagram of the control system according to the present invention.

On the other hand, referring to FIG. 6, a numeral 31 indicates an electronic control unit (ECU) which comprises a CPU 32, a ROM 33, a RAM 34, a back-up RAM 35, and an I/O interface 36 and a constant voltage circuit 38.

The constant voltage circuit 38 is connected to a battery 40 directly or indirectly through a relay contact of an ECU relay 39. Also the battery 40 is connected to a relay coil of the ECU relay 39 through an ignition switch 41.

Miscellaneous sensors 8, 9, 14, 16, 20a, 20b, 22, 24, and a vehicle speed sensor 25 to detect a vehicle speed VSP are connected to an input port of the I/O interface 36. On the other hand, the igniter 26 is connected to an output port of the I/O interface 36 and an Idle Speed Control Valve (ISCV) 11, a fuel injector 12 and an ECS (Electronic Control System) lamp 43 are connected to the output port through the driver circuit 42.

In the above ROM 33, the control programs and the miscellaneous fixed data are stored and in the above RAM 34 the after-processed data of the output signals from the above miscellaneous sensors and switches and the calculated data in the CPU 32 are stored. Further, in the back-up RAM 35 miscellaneous trouble codes and the like are stored to be memorized even when the ignition switch 41 is turned off.

In the CPU 32, an engine speed NE is calculated based on the crank angle signal from the crank angle sensor 22 and based on this engine speed NE and an intake air amount QA from the air flow sensor 8, a basic fuel injection amount is obtained. Further, in the CPU 32, based on the output from the F $O_2$ sensor 20a and the R $O_2$ sensor 20b, first the basic fuel injection amount TP is corrected and next based on miscellaneous engine parameters and this basic fuel injection amount TP, the final fuel injection amount Ti is calculated and at the same time an ignition timing $\theta_{IG}$ is calculated too.

Also, in the CPU 32, miscellaneous malfunction diagnoses such as catalyst deterioration of the catalytic converter and misfirings of the ignition system are performed and if some malfunctions are detected the ESC lamp 43 is lit to warn a vehicle driver. At the same time the corresponding trouble codes are stored in the back-up RAM 35. These trouble codes can be read out from outside by connecting a serial monitor 44 to the ECU 31 via a connector 45.

Figure 1:
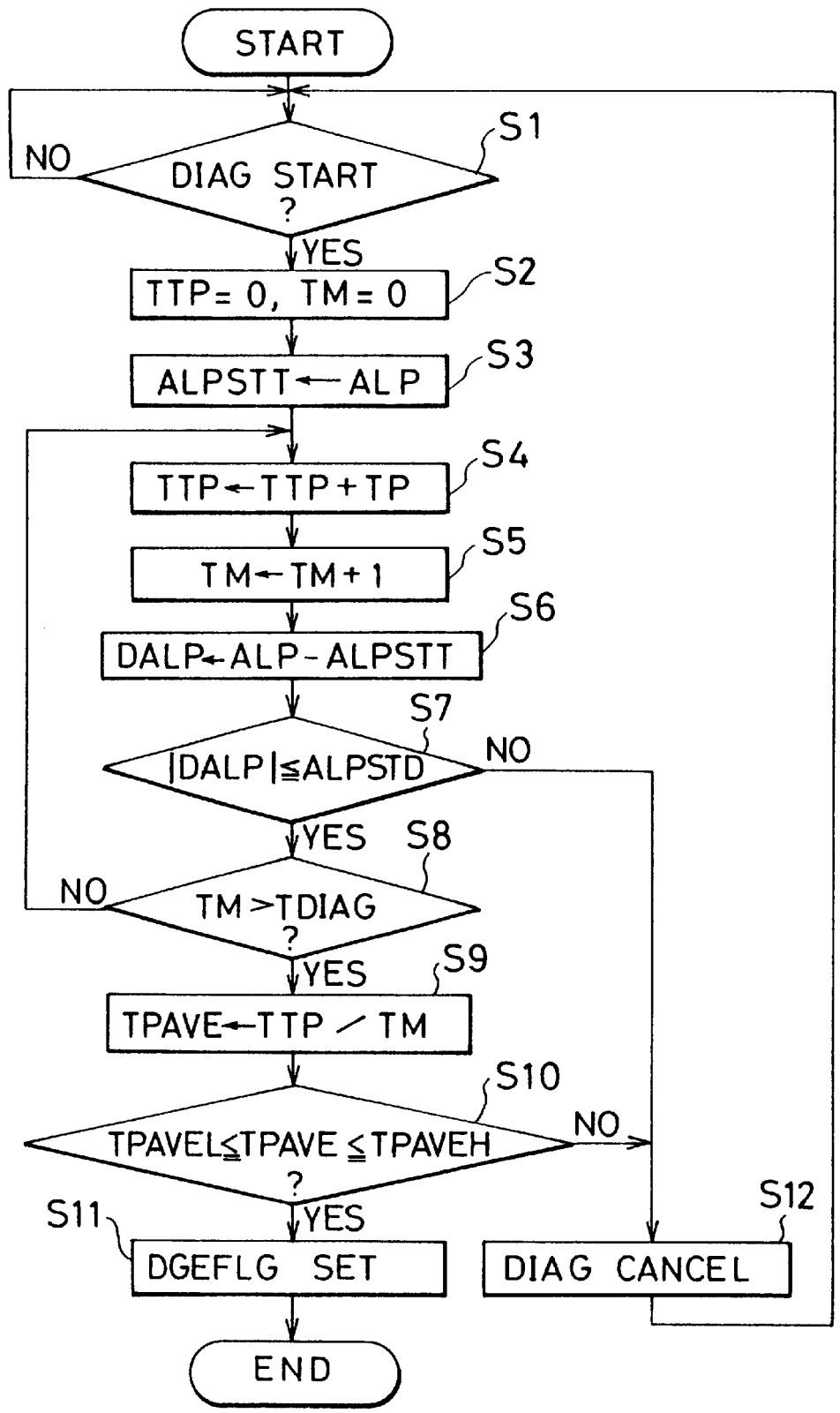
FIG. 1 is a flow chart showing a steady state judging routine according to the present invention.

Since those diagnoses are performed under a steady state operation of the engine 1 for a certain period of duration, first it is determined whether the engine is in a steady state operation or not according to the flowchart shown in FIG. 1. This flowchart is carried out when a given condition is satisfied after the ignition switch 41 is turned on.

First, at a step S1 (hereinafter, referred to as just "S1", "S2", "S3". . .), it is judged whether or not a diagnosis has been started by referring to a diagnosis starting condition. This diagnosis starting condition is, for example, whether or not a predetermined time has elapsed after an engine start, and whether or not a vehicle speed, an engine rotational speed or coolant temperature meet predetermined conditions.

If it is not judged at S1 that the diagnosis starting condition has been satisfied, the step is repeated and if it is, the step goes to the steps after S2 where it is judged whether or not the engine is in a steady state operation based upon changes of two parameters TP and ALP.

That is to say, at S2 an addition value TTP for a parameter 1 and a monitoring time TM measured by a monitoring timer are cleared and then the program goes to S3 where an ALPSTT is stored. The value ALPSTT is a value of the throttle opening angle ALP at the start of monitoring.

In this embodiment, the basic fuel injection amount TP is assigned to the parameter 1 and the throttle opening angle ALP is assigned to the parameter 2.

The program steps to S4 where a value TP of the parameter 1 is added to the addition value TTP store din the memory and at the next step S5, the value TM measured by the monitoring timer is incremented.

Then, the difference DALP between the present value ALP and the initial value ALPSTT is calculated at S6 and the absolute value |DALP| of the difference DALP is compared with a predetermined value ALPSTD at S7.

Figure 2:
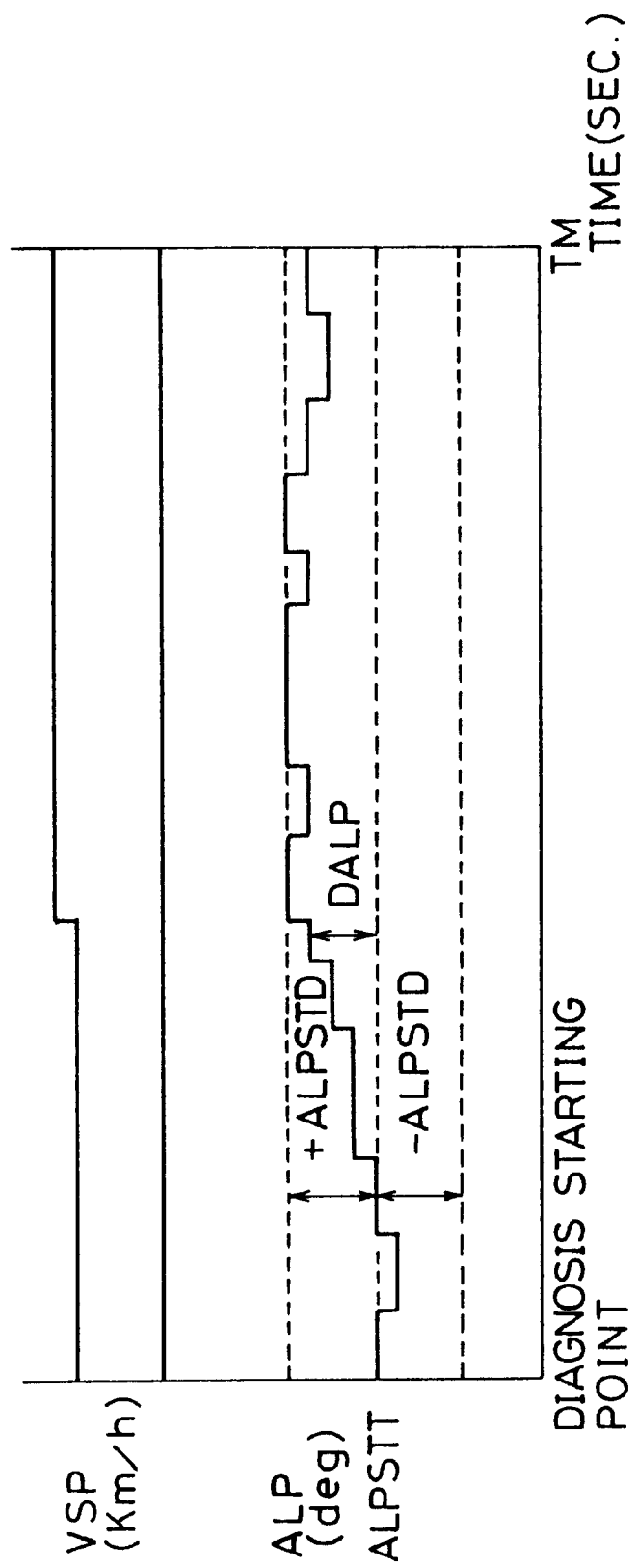
FIG. 2 and FIG. 3 are time charts respectively showing an example of the steady state judgement according to the present invention.
Figure 3:
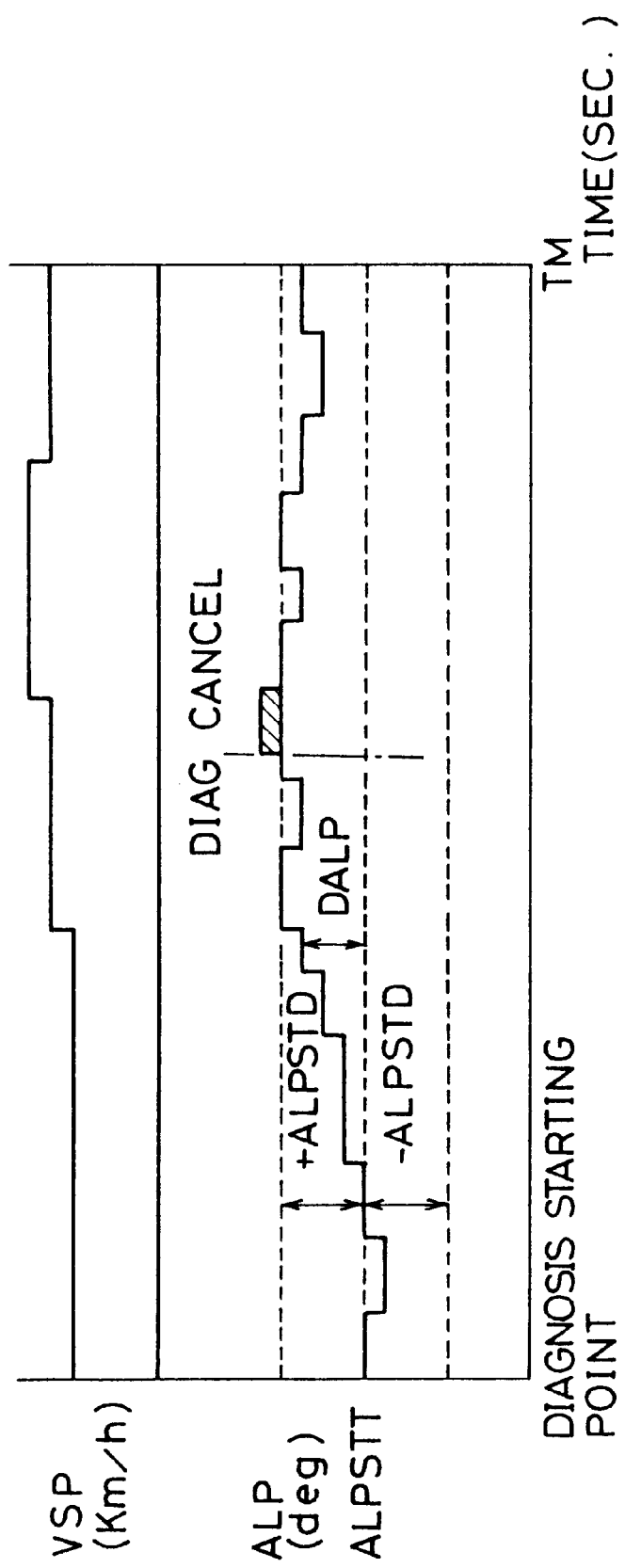

If |DALP|≦ALPSTD, the program goes to S8, since the value ALP exists within a range of ALPSTT±ALPSTD as shown in FIG. 2. On the other hand, if |DALP|>ALPSTD (a hatching portion in FIG. 3), since the value ALP goes outside the range of ALPSTT±ALPSTD, the program skips to S12 where the diagnosis is discontinued (DIAG CANCEL), and then the program returns to S1.

When the program progresses from S7 to S8, the measured time TM is compared with a predetermined time TDIAG. If TM≦TDIAG, the program returns to S4 because the diagnosis is not yet finished. On the other hand, if TM>TDIAG, the program goes to S9 where a time average TPAVE of the addition value TTP obtained at S4 is calculated. Then at S10, it is judged whether or not the average value TPAVE is within a specified restriction width (refer to FIG. 4). If the TPAVE is within the restriction width (TPAVEL≦TPAVE≦TPAVEH), the program progresses to S11 where the routine terminates after a flag DGEFLG indicating the end of diagnosis is set. On the other hand, if the TPAVE is outside the restriction width (TPAVEL>TPAVE or TPAVE>TPAVEH), the program is diverted to S12 where the diagnosis is discontinued (DIAG CANCEL), then returns to S1 at which it is judged again whether or not the diagnosis starting condition has been satisfied.

As described above, since the judgement as to whether or not the engine is in a steady state operation is made based upon a time average value of TP but not upon independent values of TP, a judgement as to whether or not the engine is in a steady state operation can be made more accurately by narrowing down the restriction width for judgement without losing a chance of diagnosis.

Further, if the flag DGEFLG for indicating the end of diagnosis is set at the above step S11 and the routine for the steady state judgement terminates, then the process of diagnosis comes to an end and the results of diagnosis are stored in the specified addresses of the back-up RAM 35. Further, once the flag DGEFLG is set, the routine is not carried out even if the diagnosis starting condition is satisfied at S1. The flag DGEFLG is cleared when the engine is restarted.

Figure 4:
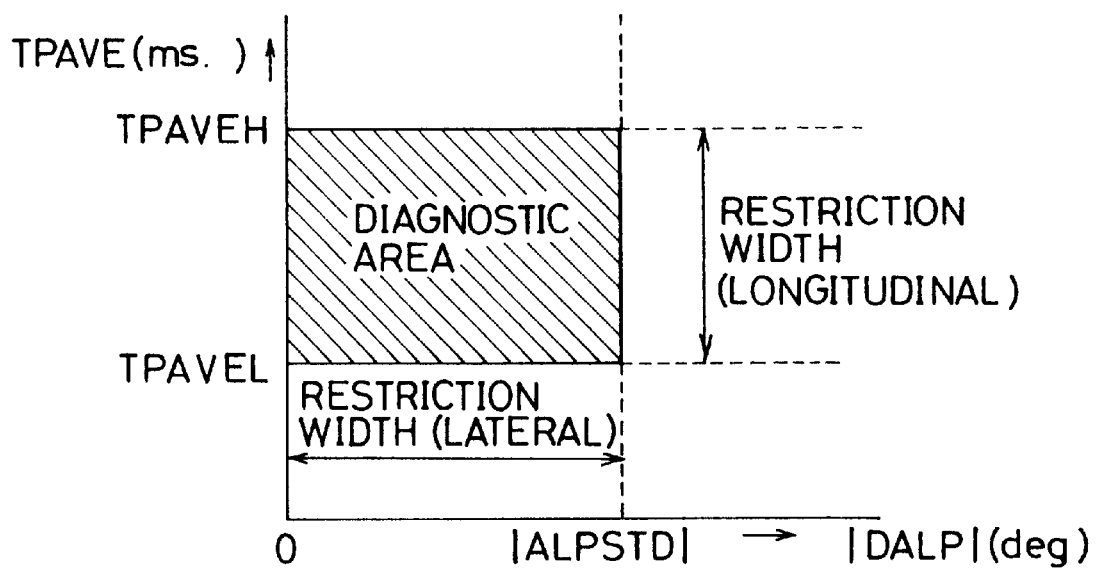
FIG. 4 is a schematic diagram showing a steady state judgement zone according to the present invention.

Thus, as shown in FIG. 4, the diagnostic area (steady state operation area) determined by the above steady state judging routine is defined as an area of TPAVEL≦TPAVE≦TPAVEH for the parameter 1 of TP and |DALP|≦ALPSTD for the parameter 2 of ALP.

Figure 7:
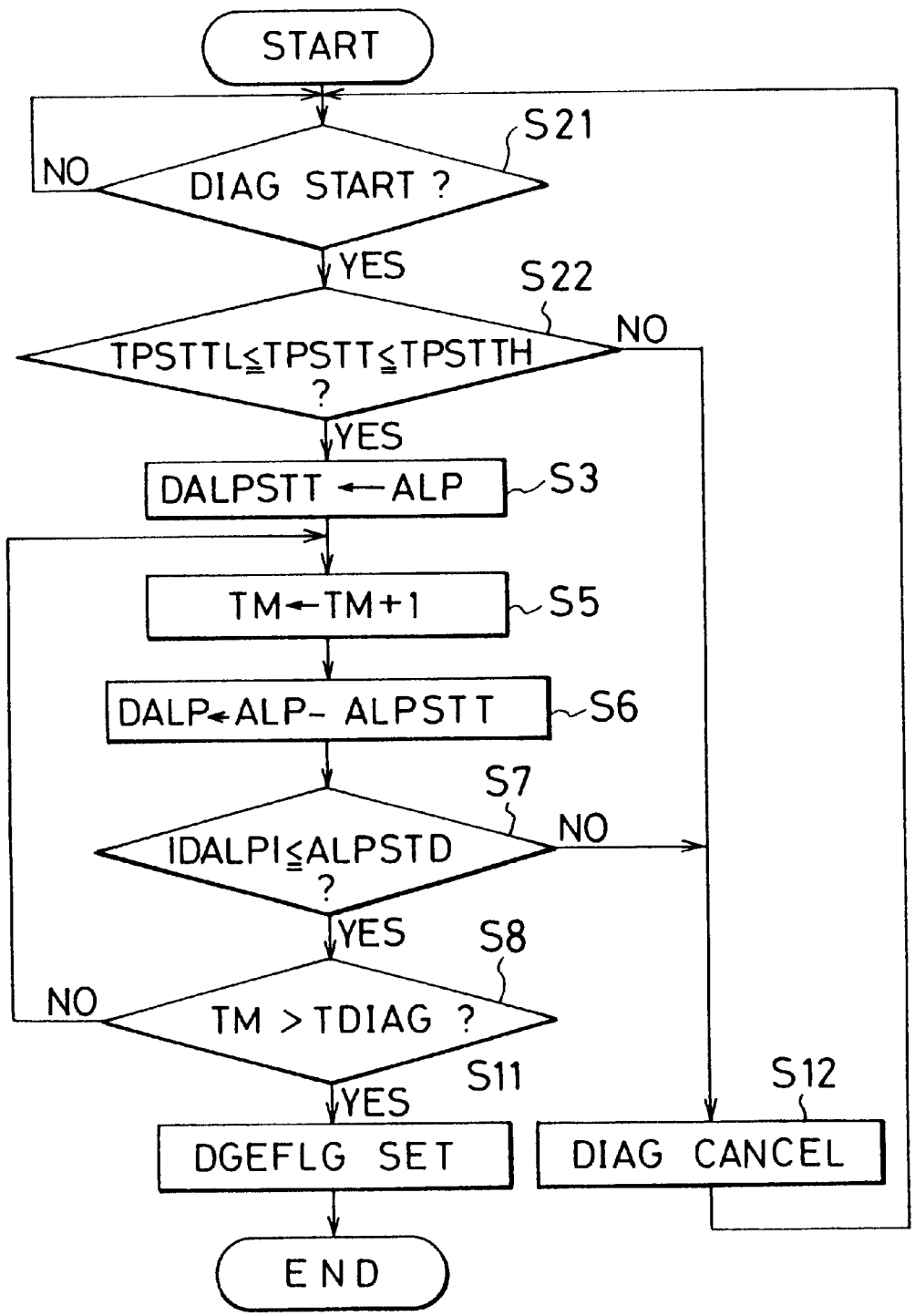
FIG. 7 is a flowchart showing a steady state judging routine according to a second embodiment of the present invention.
Figure 8:
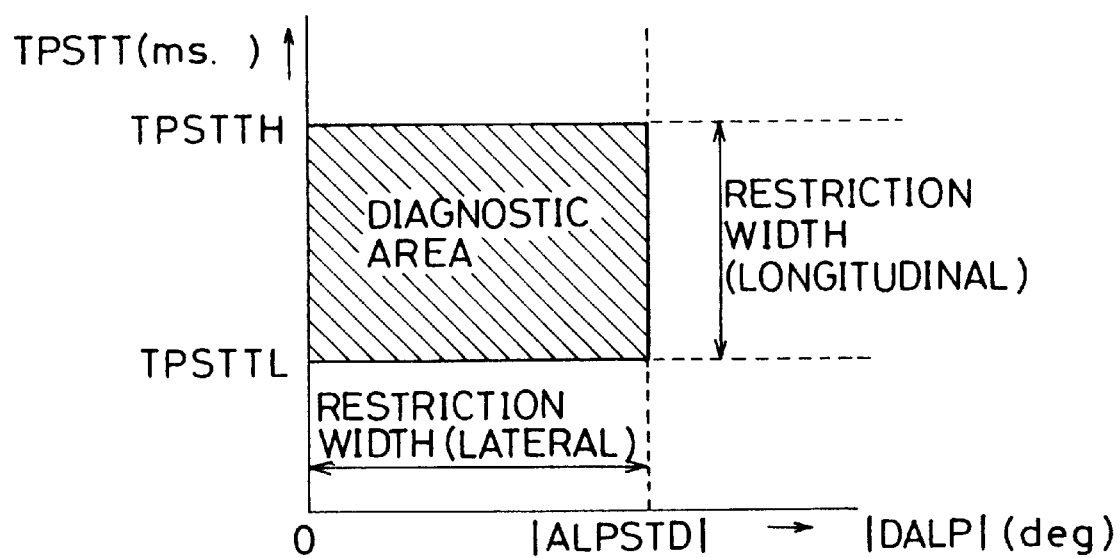
FIG. 8 is a schematic diagram showing a steady state judgement zone according to the second embodiment of the present invention.

A second embodiment according to the present invention is shown in FIG. 7 and FIG. 8. FIG. 7 is a flowchart showing a steady state judging routine according to the second embodiment and FIG. 8 is a schematic view showing a diagnostic area according to the second embodiment.

In the first embodiment described before, it is necessary to expand the capacity of the memory of the CPU because of averaging calculation. However, in this embodiment, since it is just judged whether or not the parameter value at the start of diagnosis is within a restriction width, so many sizes of memory can be saved.

The program will be described according to the flowchart of FIG. 7. The same symbol as in FIG. 1 will be used and further the description about the process will be omitted if the contents of the process is all the same. Further, in this embodiment, the value of the parameter 1 is a basic fuel injection amount TP and the value of the parameter 2 is a throttle opening angle ALP in the same manner as in the first embodiment.

When the ignition switch 41 is turned on, at S21 it is judged whether or not the diagnosis starting condition is satisfied. The judgement as to whether or not the diagnosis starting condition is satisfied will be made by referring to the parameter besides the parameter 1 as in the same manner as in the step S1 according to the first embodiment.

If the diagnosis starting condition is not satisfied, the step S21 is repeated and if it is satisfied the program goes to S22 to start the diagnosis.

At the step S22 it is judged whether or not the value TPSTT at the start of the diagnosis for the value TP of the parameter 1 is within a restriction width determined by an upper limit value TPSTTH and a lower limit value TPSTTL. If it is judged that the value TPSTT is outside the restriction width (TPSTTL>TPSTT or TPSTT>TPSTTH), the program is diverted to S12 where the diagnosis is discontinued (DIAG CANCEL) and then returns to S21 to judge again whether or not the diagnosis starting condition is satisfied.

On the other hand, when it is judged that the value TP of the parameter 1 at the start of diagnosis, namely the value TPSTT is within a restriction width (TPSTTL≦TPSTT≦TPSTTH), the steps S3, S5, S6, S7, S8, S11 and S12 are carried out in the same way as in the first embodiment.

Thus, in this embodiment, since first it is judged whether or not the value TP at the start of the diagnosis is within a restriction width, the steps S4 and S9 for calculating the average value TPAVE as shown in the first embodiment can be omitted, therefore memory in the CPU can be saved so much.

As shown in FIG. 8, the diagnostic area (steady state operation area) is defined as an area in which the value TPSTT at the start of diagnosis, namely the initial value of the parameter 1 TP is within a restriction width (TPSTTL≦TPSTT≦TPSTTH) and at the same time the variation |DALP| of the parameter 2 ALP from the start of diagnosis is within a restriction width (|DALP|≦ALPSTD).

Other aspects of the invention than those in the embodiments above described should be included in the present invention.

For example, in the first embodiment, the step for producing the average value TPAVE and judging whether or not the TPAVE is within an upper and lower limit may be omitted. In this case, the steady state judgement is performed only by a judgement as to whether or not the absolute value |DALP| is within a restriction width.

Also, as other examples, the parameter 1 may be the same parameter as the parameter 2 and further any other parameters than the basic fuel injection amount TP and the throttle opening angle ALP may be. Further, the parameters used for the steady state judgment may or may not have a relationship with the object parameters of diagnosis.

In summary, the condition identified as a steady state according to the first embodiment of the present invention is that that: a variation of a parameter for a specified monitoring time is within a predetermined restriction width; and at the same time an average value of this parameter or the other parameter to the monitoring time comes between an upper and lower limit. This method is convenient when it is necessary to monitor components or systems frequently at every opportunity.

On the other hand, the condition identified as a steady state according to the second embodiment of the present invention is: an initial value of a parameter is within a restriction width; and at the same time a variation of this parameter or the other parameter for a specified monitoring time is within a predetermined restriction width. This method is convenient when it is necessary to monitor components or systems at a particular monitoring point.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of judging a steady state operation of an engine by monitoring at least one engine parameter for a predetermined period of monitoring, comprising:

turning on an ignition switch and starting said engine;

detecting an engine parameter;

memorizing an initial value of said engine parameter at the start of said period of monitoring;

calculating a difference between said initial value of said engine parameter and said detected engine parameter;

discontinuing monitoring if said difference is outside of a predetermined restriction width before the end of said period of monitoring; and judging that said engine is in a steady state operation if said difference is within a predetermined restriction width at the end of said period of monitoring.

2. The method of judging a steady state operation of an engine according to claim 1, further comprising:

detecting a first engine parameter;

detecting a second engine parameter;

memorizing an initial value of said first engine parameter at the start of said period of monitoring;

storing said detected second engine parameter;

calculating a difference between said initial value of said first engine parameter and said detected first engine parameter;

discontinuing monitoring if said difference is outside of a first predetermined restriction width before the end of said period of monitoring;

averaging said second engine parameter over said monitoring period based on said stored second engine parameter at the end of said monitoring period;

discontinuing monitoring if said averaged second engine parameter is out of a second predetermined restriction width at the end of said monitoring period; and judging that said engine is in a steady state operation if said averaged second engine parameter is within said second predetermined restriction width at the end of said monitoring period.

3. The method according to claim 2, wherein said first engine parameter is equal to said second engine parameter.

4. A method of judging a steady state operation of an engine according to claim 1, further comprising:

detecting a first engine parameter;

detecting a second engine parameter;

memorizing an initial value of said first engine parameter at the start of said period of monitoring;

memorizing an initial value of said second engine parameter at the start of said period of monitoring;

discontinuing monitoring if said initial value of said first engine parameter is out of a third predetermined restriction width;

calculating a difference between said initial value of said second engine parameter and said detected second engine parameter;

discontinuing monitoring if said difference goes out of said fourth predetermined restriction width before the end of said monitoring period; and judging that said engine is in a steady state operation if said difference is within said fourth predetermined restriction width at the end of said monitoring period.

5. The method according to claim 4, wherein said first engine parameter is equal to said second engine parameter.

6. A diagnosing method of an engine having, a plurality of sensors for detecting a plurality of parameters of operating conditions of said engine and for generating a parameter signal, control means responsive to said parameter signal for controlling said engine at an optimum condition and for producing a control signal, a plurality of components responsive to said parameter signal for driving said engine at said optimum condition corresponding to each of said operating conditions and a diagnosis system responsive to said parameter signal for diagnosing whether said engine is operated in said optimum condition or not and whether said parameter and control signals are correct or not, comprising:

turning on an ignition switch and starting said engine;

memorizing an initial value of said parameter signal when starting a diagnosis;

setting said initial value as a reference value;

establishing a range of values based on said initial value;

subsequently detecting additional parameter signals;

calculating a difference between said initial value and each subsequently detected parameter signal;

discontinuing said diagnosing if said difference is outside said range;

judging that said engine is operated in a steady state if said difference is within said range; and continuing said diagnosing while said steady state exists so as to increase the opportunity of said diagnosis by changing said reference value in accordance with said operating conditions of said engine.

7. The diagnosing method according to claim 6 computing an averaged value of said differences in a diagnosis period if said difference is within said range;

discontinuing said diagnosing if said averaged value is outside said range;

judging that said engine is operated in a steady state if said averaged value is within said range; and continuing said diagnosing while said steady state exists so as to increase the opportunity of said diagnosis by changing said reference value in accordance with said operating conditions of said engine.

8. A diagnosing method of an engine having a plurality of sensors for detecting a parameter of operating conditions of said engine and for generating a parameter signal, control means responsive to said parameter signal for controlling said engine at an optimum condition and for producing a control signal, a plurality of components responsive to said parameter signal for driving said engine at said optimum condition corresponding to each of said operating conditions and a diagnosis system responsive to said parameter signal for diagnosing whether said engine is operated in said optimum condition or not and whether said parameter and control signals are correct or not, comprising:

turning on an ignition switch and starting said engine;

judging whether an initial value of said parameter signal at a starting time of a diagnosis is within range or not;

memorizing said initial value as a reference value if said initial value is within said range;

calculating a difference between said initial value and each detected parameter signal thereafter;

discontinuing said diagnosing if said difference is outside said range;

judging that said engine is operated in a steady state if said difference is within said range; and continuing said diagnosing while said steady state exists so as to increase the opportunity of said diagnosis by changing said reference value in accordance with said operating conditions of said engine.

* * * * *